(12) United States Patent
Stephenson et al.

(10) Patent No.: US 6,502,393 B1
(45) Date of Patent: Jan. 7, 2003

(54) HYDRAULIC SYSTEM WITH CROSS FUNCTION REGENERATION

(75) Inventors: Dwight B. Stephenson, Delafield, WI (US); Randall S. Jackson, Burlington, WI (US); Brian Clifton, Stockport (GB)

(73) Assignee: Husco International, Inc., Waukesha, WI (US)

( * ) Notice: Subject to any disclaimer, the term of this patent is extended or adjusted under 35 U.S.C. 154(b) by 22 days.

(21) Appl. No.: 09/658,842

(22) Filed: Sep. 8, 2000

Related U.S. Application Data
(60) Provisional application No. 60/180,252, filed on Feb. 4, 2002.

(51) Int. Cl.[7] .............................................. F16D 31/02
(52) U.S. Cl. .......................................... 60/414; 60/424
(58) Field of Search ........................... 60/414, 422, 424, 60/461

(56) References Cited

U.S. PATENT DOCUMENTS

| | | | | | |
|---|---|---|---|---|---|
| 4,977,928 A | * | 12/1990 | Smith et al. | ................... | 60/424 |
| 5,678,470 A | * | 10/1997 | Koehler et al. | ................. | 91/459 |
| 5,878,569 A | * | 3/1999 | Satzler | .......................... | 60/419 |
| 5,960,695 A | * | 10/1999 | Aardema et al. | .............. | 91/454 |
| 6,151,894 A | * | 11/2000 | Endo | ........................... | 60/414 |

* cited by examiner

*Primary Examiner*—F. Daniel Lopez
(74) *Attorney, Agent, or Firm*—George E. Haas; Quarles & Brady LLP

(57) ABSTRACT

A regeneration method for a hydraulic system enables the fluid being forced from a first actuator to be used to power a second actuator. Often the force of the load acting on a hydraulic actuator is used to move the actuator into a given position which motion forces fluid from the actuator. Rather than simply draining that fluid to the system tank, the fluid is routed to a second actuator to be powered when the pressure of the fluid draining at the first actuator is greater than the pressure required to power the second actuator. At other times the draining fluid can be used to drive the pump which has been configured to operate as a motor thereby driving the prime mover connected to the pump. Alternatively the draining fluid can be routed to an accumulator where it is stored under pressure until needed to power an actuator of the system. A unique bidirectional pilot operated poppet valve.

26 Claims, 4 Drawing Sheets

HYDRAULIC SYSTEM WITH CROSS FUNCTION REGENERATION

This application claims benefit of U.S. Provisional Patent Application No. 60/180,252 filed Feb. 4, 2002.

BACKGROUND OF THE INVENTION

The present invention relates to hydraulic systems having a pump that supply pressurized fluid to one or more actuators that operate devices on machinery, and particularly to recovering energy produced from lowering loads and stopping inertial loads in such systems.

Construction and agricultural equipment have moveable members which are operated by an actuator, such as a hydraulic cylinder and piston arrangement. Application of pressurized hydraulic fluid from a pump to the actuator can be controlled by a set of proportional solenoid valves of a type described in U.S. Pat. No. 5,878,647. When an operator desires to move a member on the equipment a control lever is operated to send signals to the solenoid valves for the cylinder associated with that member. One solenoid valve is opened to supply pressurized fluid to the cylinder chamber one side of the piston and another solenoid valve opens to allow fluid being forced from the opposite cylinder chamber to drain to a reservoir, or tank. By varying the degree to which the solenoid valves are opened, the rate of flow into the associated cylinder chamber can be varied, thereby moving the piston at proportionally different speeds.

Many hydraulic systems waste energy by lowering loads (potential energy) or by stopping inertial loads (kinetic energy) through dissipation devices, such as restrictive valving or friction braking.

Some prior hydraulic systems direct the fluid forced from the non-powered cylinder chamber to assist in powering the other chamber of the same cylinder, rather than routing the expelled fluid to the tank. This enables the piston of that cylinder to move at a faster speed that the pressure from the pump would otherwise enable. This action, reduces the cycle time of the hydraulic actuator. Recycling the hydraulic fluid from a non-powered chamber to the powered chamber of the same cylinder often is referred to in the art as "regeneration".

The present invention relates to recovering the potential and kinetic energy produced in a hydraulic system by the loads. This recovered energy is used to operate another simultaneous commanded actuator function, store energy in an accumulator, or add torque to the prime mover.

SUMMARY OF THE INVENTION

A regeneration method for a hydraulic system utilizes hydraulic fluid drained under pressure from an actuator in the system, as occurs due to the force of a load acting on the actuator. The pressure of the hydraulic fluid being drained from the actuator is sensed to produce an indication of a first pressure. The pressure of hydraulic fluid at an inlet of a hydraulic power converting device in the system also is sensed to produce an indication of a second pressure. When the first pressure is greater than the second pressure, the drained hydraulic fluid is routed to the inlet of the hydraulic power converting device to drive the latter device.

The hydraulic power converting device may be another actuator or the pump of the hydraulic system where the pump is configured to act as a motor and drive the prime mover. As an alternative, the fluid drained from the actuator is stored under pressure in an accumulator. Thereafter when hydraulic power is required by an actuator, the fluid is routed from the accumulator to that actuator requiring power.

A unique hydraulic system also is described for implementing this method. The system has a transfer line through which the hydraulic fluid drained from an actuator is routed as an alternative to sending that fluid to the system tank. Check valves enable the one-way flow of fluid from the draining actuator to the transfer line. Isolation valves connect the transfer line to the inlet of conventional control valves that regulate the supply of fluid from the pump to the actuators. Proportional regeneration regulation valves control the flow of fluid from the draining actuator to the tank so that at least a portion of that fluid will be directed to the transfer line. By selectively controlling the isolation and regeneration regulation valves, the fluid draining from one actuator can be used to power another actuator. Other variations of the regeneration system enable the draining fluid to drive the pump as a motor, thereby driving the prime mover attached to the pump.

DETAILED DESCRIPTION OF THE INVENTION

Figure 1:
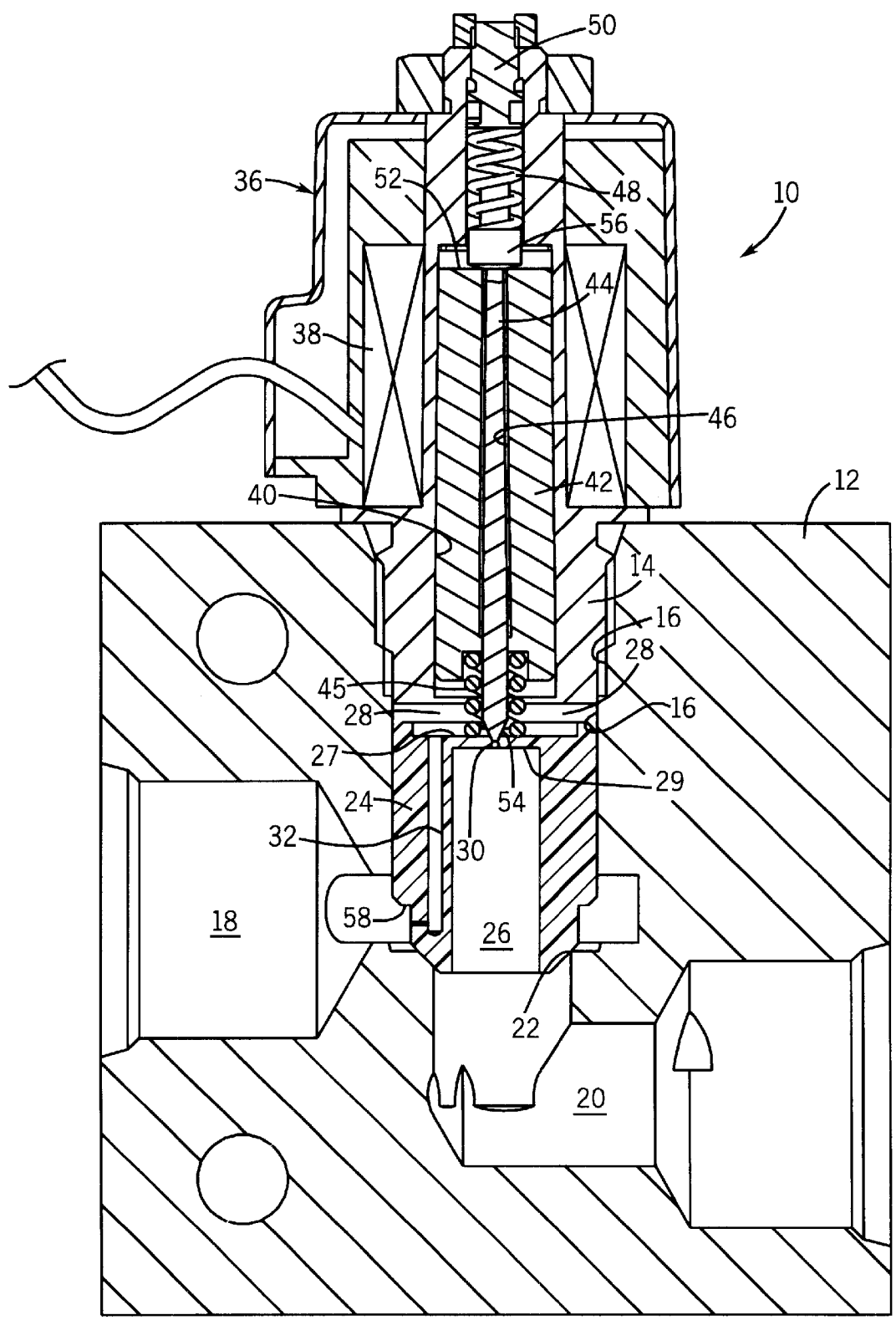
FIG. 1 is cross section through a solenoid operated pilot valve according to the present invention.

With initial reference to FIG. 1, a solenoid valve 10 useful in controlling equipment actuators comprises a cylindrical valve cartridge 14 mounted in a longitudinal bore 16 of a valve body 12. The valve body 12 has a transverse inlet passage 18 which communicates with the longitudinal bore 16. An outlet passage 20 extends through the valve body 12 and communicates with an interior end of the longitudinal bore 16. A valve seat 22 is formed between the inlet and outlet passages 18 and 20.

A main valve poppet 24 slides within the longitudinal bore 16 with respect to the valve seat 22 to selectively control flow of hydraulic fluid between the inlet and outlet passages. The main valve poppet 24 preferably is made from a thermoplastic that is reinforced with glass fibers, such as Torlon (trademark of BP Amoco Plc). A central cavity 26 is formed in the main valve poppet 24 and extends from an opening at the outlet passage 20 to a closed end 27. The thickness of the wall at the closed end 27 forms a flexible diaphragm 29 and a pilot passage 30 extends through the diaphragm. The main valve poppet 24 defines control chamber 28 in the longitudinal bore 16 on the remote side of the diaphragm 29 from central cavity 26. The opposite sides of the diaphragm 29 are exposed to the pressures in the control chamber 28 and the poppet's central cavity 26. A supply channel 32 extends through the main valve poppet 24 from the supply passage 18 to the control chamber 28.

Movement of the main valve poppet 24 is controlled by a solenoid 36 comprising an electromagnetic coil 38, an armature 42 and a pilot poppet 44. The armature 42 is positioned within a bore 40 through the cartridge 14 and a first spring 45 biases the main valve poppet 24 away from the armature. The pilot poppet 44 is located within a bore 46 of the tubular armature 42 and is biased toward the armature by a second spring 48 that engages an adjusting screw 50 threaded into the cartridge bore 40. The electromagnetic coil 38 is located around and secured to cartridge 14. The armature 42 slides within the cartridge bore 40 away from main valve poppet 24 in response to an electromagnetic field created by applying electric current to energize the electromagnetic coil 38.

In the de-energized state of the electromagnetic coil 38, a second spring 48 forces the pilot poppet 44 against end 52 of the armature 42, pushing both the armature and the pilot poppet toward the main valve poppet 24. This results in a conical tip 54 of the pilot poppet 44 entering and closing the pilot passage 30 in the main valve poppet, thereby terminating communication between the control chamber 28 and the outlet passage 20.

The solenoid valve 10 proportionally controls the flow of hydraulic fluid between the inlet and outlet passages 18 and 20. The rate of hydraulic fluid flow through the valve is directly proportional to the magnitude of electric current applied to the coil 38. The electric current generates an electromagnetic field which draws the armature 42 into the solenoid coil 38 and away from the main valve poppet 24. Because end 52 of the armature 42 engages a shoulder 56 on the pilot poppet 44, that latter element also moves away from the main valve poppet 24, thereby allowing hydraulic fluid to flow from the inlet passage 18 through the control chamber 28, pilot passage 30 and the outlet passage 20.

The flow of hydraulic fluid through the pilot passage 30 reduces the pressure in the control chamber 28 to that of the outlet passage. Thus the higher pressure in the inlet passage that is applied to the surface 58 forces main valve poppet 24 away from valve seat 22 thereby opening direct communication between the inlet passage 18 and the outlet passage 20. Movement of the main valve poppet 24 continues until contact occurs with the conical tip 54 of the pilot poppet 44. Thus, the size of this valve opening and the flow rate of hydraulic fluid there through are determined by the position of the armature 42 and pilot poppet 44. Those positions are in turn controlled by the magnitude of current flowing through the electromagnetic coil 38.

The effect that a pressure differential has on the pilot poppet 44 is counterbalanced by flexure of the diaphragm 29 of the main valve poppet 24 in response to that pressure differential. Such movement effectively changes the position of the pilot passage 30 so as to offset the pressure force change on the pilot valve. The designed flexibility of the diaphragm is determined based on the pilot spring rate.

Figure 2:
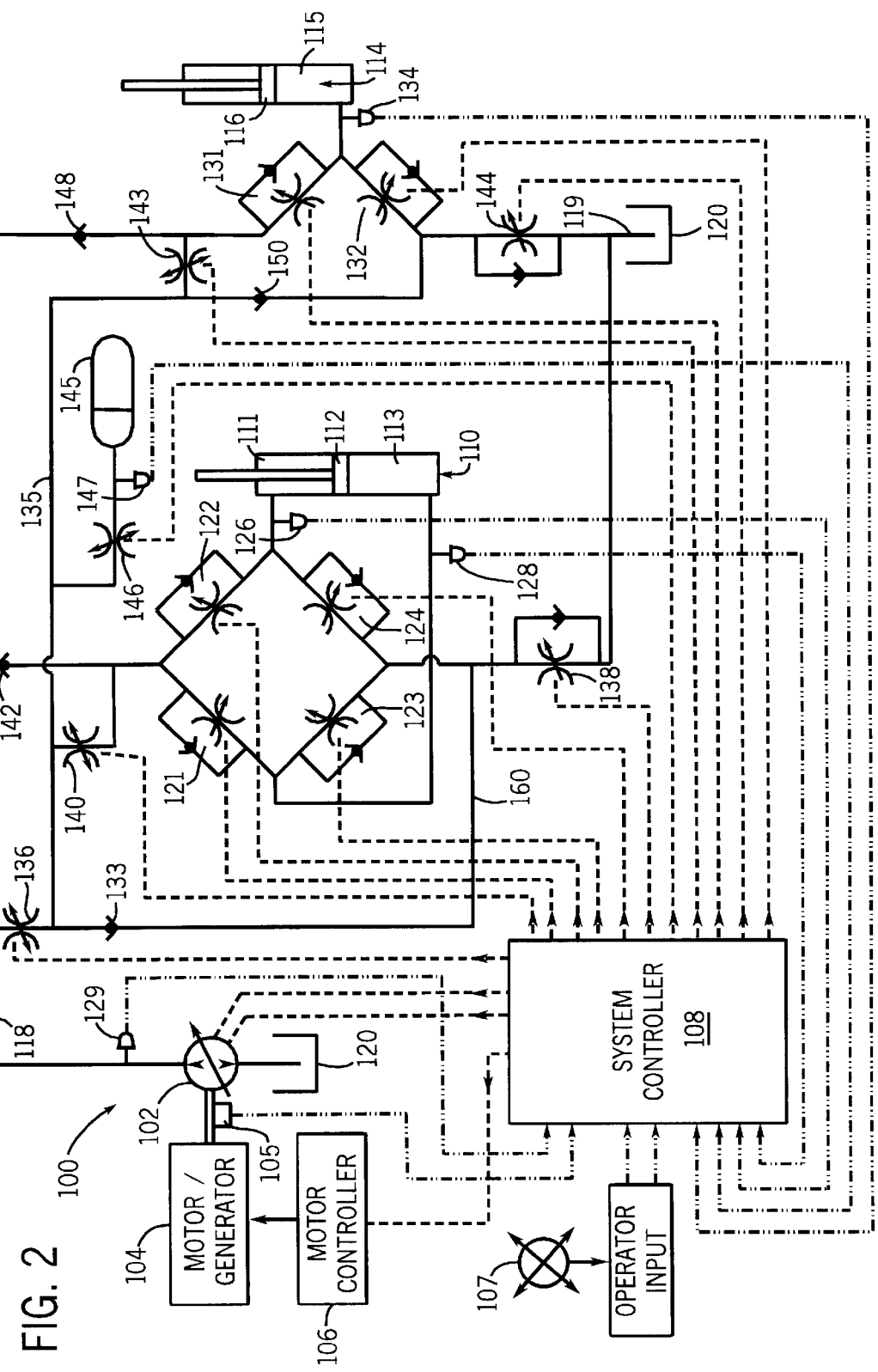
FIG. 2 is an schematic diagram of a hydraulic system with both cross functional and actuator to prime mover regeneration.

This type of valve can be utilized to control actuators in a hydraulic system such as the one shown in FIG. 2. Hydraulic lines are designated by a solid lines in the drawing, electrical conductors carrying signals for operating valves and other components are designated by dashed lines, and electrical conductors carrying signals from sensors and operator input devices are designated by dotted lines.

Pressurized hydraulic fluid is provided by an over-center pump 102 driven by a motor/generator 104 which serves as the prime mover of the hydraulic system 100. A tachometer 105 or other speed sensing device is coupled to the shaft between the motor generator 104 and pump 102 to provide a speed sensing signal to a system controller 108. The motor/generator 104 is controlled by a motor controller 106 that receives commands from the system controller 108, which is a microcomputer based device of a type commonly used in off-road equipment. The system controller 108 receives inputs from operator input devices such as a conventional joystick 107.

The pump 102 also receives a signal from the system controller 108 which determines the position of the swash plate within the pump 102. The swash plate position not only controls the variable displacement output of the pump, but also can place the pump in a motor mode in which the hydraulic fluid being fed back to the pump from the hydraulic system can drive the pump and the hence drive the motor generator 104 to generate electricity, as will be described. The system controller 108 also determines the stroke of the pump 102.

This hydraulic system 100 is incorporated in machinery that has mechanical elements operated by hydraulically driven actuators, such as cylinders 110 and 114 with pistons 112 and 116. The first cylinder 110 is a double acting type in that pressurized fluid can be applied to either side of its piston 112. A set of four proportional control valves 121, 122, 123, and 124, of the type shown in FIG. 1, control the flow of hydraulic fluid into and out of the chambers within cylinder 110. This type of valve is depicted schematically as an electrically controlled variable orifice in parallel with a check valve. In the set of control valves, fluid from the pump 102 is applied via a supply line 118 and a first check valve 142 to first and second control valves 121 and 122. The first control valve 121 governs flow of fluid from the supply line 118 to the bottom chamber 113 of the cylinder 110 and the second control valve 122 governs flow of fluid from the supply line to the upper chamber 111 on the rod side of the piston 112. The third control valve 122 regulates the draining of fluid from the bottom cylinder chamber 113 to a tank line 119 that leads to the tank 120 for the system, and the fourth control valve 124 controls the flow of fluid from the upper chamber 111 of cylinder 110 to the tank. These four solenoid operated control valves 121–124 are all operated by signals from the system controller 108. The system controller 108 also receives signals from pressure sensors 126 and 128 which respectively sense the pressure within the upper and lower chambers of cylinder 110. Another pressure sensor 129 is placed in the pump outlet line 118 to provide a pressure measurement signal to the system controller 108.

Fifth and sixth proportional solenoid control valves 131 and 132, of the type shown in FIG. 1, control the flow of hydraulic fluid to and from the second cylinder 114. The second cylinder 114 is a single acting device in that hydraulic fluid is only applied to one of its chambers 115. Specifically, the fifth control valve 131 governs flow of fluid from the supply line 118 to the second cylinder 114 and the sixth control valve 132 regulates the flow of fluid from that cylinder to the tank 120. A second check valve 148 is placed between the supply line 118 and the inlet to the fifth control valve 131 to prevent fluid flowing from the valve into the supply line. Another pressure sensor 134 detects the pressure within the lower chamber 115 of the second cylinder 114. The signal from that sensor 134 is applied as an input to the system controller 108, which also provides operating signals to the fifth and sixth control valves 131 and 132.

The arrangement of components in the hydraulic system 110 described thus far is similar to previous hydraulic systems. However, additional components in system 100 are provided to enable cross functional regeneration and load to prime mover regeneration, which are novel features of the present hydraulic system.

To implement this novel functionality, the outlets of the third and fourth solenoid control valves 123 and 124 are connected by a check valve 133 to a regeneration transfer conduit 135. Check valve 133 permits fluid to flow only from those valve outlets to the transfer conduit 135. A first isolation valve 136 selectively couples the transfer conduit 135 to the supply line 118, and a second isolation valve 140 selectively couples the inlets of the first and second control valves 121 and 122 to transfer conduit 135. A first regeneration regulation valve 138 is located between the outlets of the third and fourth control valves 123 and 124 and the tank line 119. The first regeneration regulation valve 138 is a proportional valve, of the type shown in FIG. 1 for example.

With continuing reference to FIG. 2, similar isolation and check valves are added to the hydraulic circuit for the second cylinder 114. Specifically, a third isolation valve 143 is placed between the inlet to the fifth control valve 131 and the transfer conduit 135. A third check valve 150 couples the outlet of the sixth control valve 132 to the transfer conduit 135 and permits fluid to flow only from that valve outlet to the transfer conduit 135. A second regeneration regulation valve 144 is placed between the outlet of the sixth control valve 132 and the tank 120. The first and second regeneration regulation valves 138 and 144 are proportional valves of the same type as the control valve 10 in FIG. 1, for example.

An accumulator 145 is connected to transfer conduit 135 by an accumulator isolation valve 146, which controls the flow of fluid into and out of the accumulator 145. A pressure sensor 147 measures the pressure in the accumulator.

The regeneration capability of the hydraulic system 100 just described utilizes the hydraulic fluid being forced from a chamber of one cylinder 110 or 114 to either enhance movement of either cylinder, store energy in the accumulator 145, or apply torque to the pump 102 thereby driving the motor/generator 114 to produce electrical power. The selection of the different combinations of functionality of the present system 100 is performed by the system controller 108, as will be described.

Assume that the first cylinder 40 is being driven, in which case either the first or second control valve 121 or 122 will be opened to apply pressurized hydraulic fluid from the supply line 118 to either the upper or lower cylinder chamber 111 or 113. Correspondingly, either the fourth or third control valve 124 or 123, respectively, will be opened to drain the hydraulic fluid from the opposite cylinder chamber. For example, to move the piston 112 in the upward direction, the first control valve 121 will open to convey fluid from the supply line 118 to the lower cylinder chamber 113. As the piston 112 rises, the fluid previously filling the upper chamber 111 is forced out through the fourth control valve 124. In a non-regeneration mode, the fluid from the upper chamber 111 flows through a fully opened first regeneration regulation valve 138 to the tank 120. In this mode, all of the isolation valves 136, 140, 143 and 146 are held closed.

If the conventional self regeneration mode is desired for the first cylinder at this time, the system controller 108 closes the first regeneration regulation valve 138 by an amount proportional to the required amount of fluid needed for regeneration. The second isolation valve 140 also is opened to conduct the fluid being forced out of the upper cylinder chamber 111 to the inlet of the first control valve 121. That recycled fluid adds to the flow from the pump supply line 118 thus increasing the amount of fluid applied to the lower chamber 113 of cylinder 110. The magnitude of the regeneration is inversely proportional to the amount that the first regeneration regulation valve 138 is close and is controlled by varying the position of that valve element. This operation is similar to conventional regeneration where fluid from the same cylinder is utilized to increase its speed of motion.

The present hydraulic system 100 has the addition of a novel cross regeneration mode of operation. In many types of equipment, it is common for several members to be linked together mechanically and individually controlled by separate hydraulic actuators. For example in a lift truck, the second cylinder 114 raises and lowers the boom having the forks or platform that carries the load. The boom is tilted with respect to the body of the truck by the first double acting cylinder 110. To lower the boom, the lift truck operator moves the joystick to open the sixth control valve 132 and allow fluid to drain from the lower chamber 115 of the second cylinder 114. The boom then lowers due to the weight of the load. The load force is exerted on the piston 116 of the second cylinder 114 forcing fluid from cylinder chamber 115. Assume that as the boom is lowering the operator simultaneously commands the boom to be tilted by applying fluid power to the lower cylinder chamber 113 of the first cylinder 110.

When these concurrent functions are occurring, the cross regeneration mode is permitted under certain conditions. Cross regeneration is where the fluid forced from one actuator by its load is used to power another actuator. In the present example, the fluid being forced from the second cylinder 114 through the sixth control valve 132 can be directed to the first cylinder 110 to provide cross regeneration. However in order for cross regeneration to occur, the over-running load pressure (from the second cylinder 114) must be greater than the concurrent pressure demand (for powering first cylinder 110) by a first margin in order to account for control metering. In addition the flow rate command of the over-running load (for second cylinder 114) must exceed the concurrent function flow demand (for second cylinder 114), preferably by a second margin.

In the above example, the hydraulic fluid forced from the second cylinder 114 through the sixth control valve 132 is routed to the first cylinder 110 to provide cross regeneration. The over-running load pressure from the second cylinder 114 is sensed by pressure sensor 134 which provides an indication of a first pressure. The concurrent pressure demand for powering the lower chamber 113 of first cylinder 110 measured by sensor 128 which provides an indication of a second pressure. The first criterion for cross regeneration is satisfied when the first pressure is greater than the second pressure by 300 to 500 psi.

The second criterion for cross regeneration is based on the flow commands for the two actuators, the first and second cylinders 110 and 114. The flow commands are indicated by the operator's positioning of the joystick 107. Specifically the operator must command a greater flow rate for the over-running load actuator (second cylinder 114) than that commanded to power the concurrent function (first cylinder 110).

When the system controller 108 determines that the cross regeneration criteria are satisfied, it closes the second regeneration regulation valve 144 to achieve a flow to the tank which is equal to the difference between the flow rate command of the over-running load and the concurrent function flow demand. This action routes at least a portion of the fluid exiting the second cylinder 114 and the sixth control valve 132 through check valve 150 into transfer conduit 135. That routed flow equals the concurrent function flow demand for the first cylinder 114 to be powered. The first and third isolation valves 136 and 143 are held closed, while the second isolation valve 140 is opened. Thus fluid from the second cylinder 114 is carried by the transfer conduit 135 to the second isolation valve 140 through which the fluid flows to the inlets of the first and second control valves 121 and 122 for the first cylinder 110. The fluid continues to flow through the first control valve 121, which is open, to the lower chamber 113 of the first cylinder 110, in place of flow from the supply line 118.

It should be understood that alternatively the first control valve 121 can be closed and the second control valve 122 opened to direct this regeneration flow to the upper chamber 111 of the first cylinder 110 produces an the opposite motion of the piston 112. One skilled in the art also will appreciate that fluid forced out of the first cylinder by an over-running load can be routed to assist in powering the second cylinder using this cross regeneration feature.

With continuing reference to FIG. 2, the hydraulic system 100 also can be operated in a load to prime mover regeneration mode in which the fluid being forced out of an actuator can be directed to drive the over-center pump 102 as a motor thereby producing electricity from the motor/ generator 104. For example, as the second cylinder 114 lowers under the weight of its load, hydraulic fluid is forced out of the lower chamber 115 through the open drain control valve 132. That fluid can be directed through transfer conduit 135 by at least partial closure of second regeneration regulation valve 144 and closure of the third isolation valve 143. This flow then is directed through an opened first isolation valve 136 from the transfer conduit 135 to the supply line 118. Note that at this time the second isolation valve 140 is maintained in a closed state. As long as the first cylinder 110 is not being powered, the fluid will be forced backwards to the inlet of the pump 102.

In this mode of operation, referred to as load to prime mover regeneration, the system controller 108 commands that the swash plate of the hydraulic pump 102 move into a position where the pump acts as a motor. The system controller also sets the stroke of the pump. In other words, the pump 102 is set up so that the reverse fluid flow from an actuator goes from the pump outlet to its inlet while the prime mover, motor/generator 104, keeps turning in the same direction as when driving the pump. Thus the pump 102 is driven as a motor by the backward flow of hydraulic fluid passing to tank 120. This action causes the pump 102 to drive the motor/generator 104 producing electric current, which can be utilized to charge batteries, for example.

The present regeneration system has a third mode of operation in which energy produced by an over running load acting on an actuator is stored in the accumulator 145. The description of this storage mode continues to use the example where an over-running load is forcing fluid from the second cylinder 114 through the sixth control valve 132. To store the energy of this fluid, the second regeneration regulation valve 144 is closed which causes the fluid to be routed through check valve 150 to transfer conduit 135. Note that at this time the third isolation valve 143 is closed as are the first and second isolation valves 136 and 140 at the other end of the transfer conduit 135.

Thus by opening the accumulator isolation valve 146, the fluid being forced from the second cylinder 114 enters the accumulator 145. While this is occurring the system controller 108 is monitoring the pressures at the second cylinder 114 and the accumulator 145 as measured by pressure sensors 134 and 147, respectively. When the pressure at the accumulator 145 equals the pressure at the second cylinder 114 the energy storage is terminated by the system controller. The accumulator isolation valve 146 now is closed and the second regeneration regulation valve 144 is opened fully to direct the remaining fluid in the second cylinder to the tank 120.

Thereafter the fluid energy stored in the accumulator 145 is available to assist in powering an actuator, either the first or second cylinder 110 or 114, of the hydraulic system 100. To accomplish this, the system controller 108 employs the signal from pressure sensor 147 to determine whether the pressure of the fluid stored in the accumulator 145 exceeds the concurrent pressure demand for the cylinder to be powered by a first nominal margin. If that relationship exists, the accumulator isolation valve 146 is opened along with one of the second or third isolation valves 140 or 143 depending upon which cylinder 110 or 114, respectively, is to be powered by the stored fluid. the system controller 108 continues to monitor the second cylinder pressure and the accumulator pressure. When the above pressure relationship no longer exists the isolation valves are closed.

The stored fluid energy in the accumulator 145 also may be employed for a form of prime mover regeneration at times when the pump is not required to power one of the actuators 110 or 114. In this state, fluid is directed from the accumulator through the first isolation valve 146 to the pump. The system controller 108 commands that the swash plate of the hydraulic pump 102 move into a position where the pump acts as a motor so that the fluid energy drives the motor/generator to produce electricity as described above.

Thus, the present hydraulic system 100 includes components which selectively allows alternative regeneration modes. These modes include conventional self regeneration, where fluid forced from one chamber of an actuator is routed to power another chamber of the same actuator. In the cross regeneration fluid forced from one actuator powers another actuator to aid in the recipient actuator's operation, and in the actuator to prime mover regeneration mode fluid from an actuator is fed back to drive the prime mover. A storage regeneration mode stored the energy in the fluid forced from an actuator in an accumulator for subsequent use in powering an actuator or the prime mover. It further is possible to activate more than one of these modes simultaneously. Priority is given to reroute the hydraulic flow to concurrent lower pressure functions and then to the accumulator 145. Lastly the fluid is routed to the prime mover.

The present invention has been described as though only one regeneration mode occurs at a time. However when the flow rate command of the over-running load provides significantly more fluid flow than that required by a single concurrent function, the excess flow can be routed to a third concurrent function.

Figure 3:
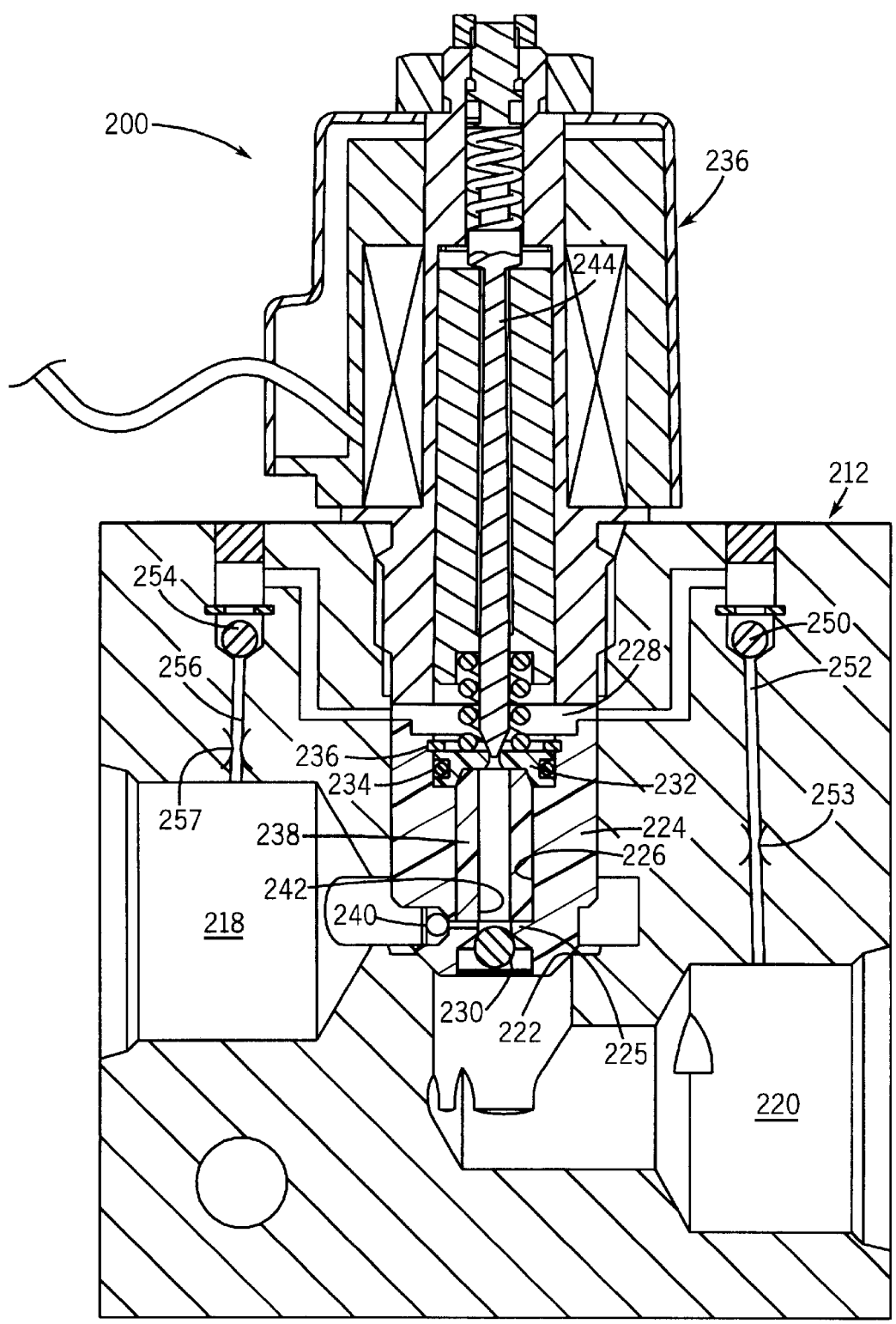
FIG. 3 is cross sectional view of a bidirectional solenoid operated pilot valve.

FIG. 3 depicts a bidirectional proportional valve 200 that is operated by a solenoid 236. This valve 200 is similar to that in FIG. 1 with the primary difference being the main valve poppet 224 that slides within the longitudinal bore 216 with respect to the valve seat 222 to selectively control flow of hydraulic fluid between the inlet and outlet passages 218 and 220, respectively. A control chamber 228 is defined in the valve body 212 on the side of the main valve poppet 224 that is remote from the valve seat 222.

The main valve poppet 224 preferably is made from a thermoplastic that is reinforced with glass fibers. A central bore 226 is formed axially through the main valve poppet 224 and has a shoulder 225 spaced from one end that opens into the outlet passage 220. A first check valve 230 is located in the main valve poppet between the shoulder 225 and that one end to allow fluid to flow only from the poppet's central bore 226 into the outlet passage 220. The other end of the central bore 226 opens into the control chamber 228 and contains a resilient diaphragm 232 held in place by a snap ring 236. An O-ring 234 provides a seal between the diaphragm and the wall of the central bore 226. A resilient tubular column 238 made of the same material as the main valve poppet is within the central bore 226 and biases the diaphragm 232 with respect to the bore shoulder 225. The opposite sides of the diaphragm 232 are exposed to the pressures in the control chamber 228 and in the bore of the tubular column 238. The diaphragm 232 has an aperture which receives the tip of the pilot poppet 244 which closes the aperture.

A second check valve 240 is located within the main vale poppet 224 in a passage that extends between the inlet passage 218 and the end of the central bore adjacent to the shoulder 225. Both flow passages controlled by the first and second check valves 230 and 240 are in constant communication with the bore through the tubular column 238.

The valve body 212 incorporates a third check valve 250 in a passage 252 extending between the control chamber 228 and the outlet passage 220. The third check valve 250 allows fluid to flow only in the direction from the control chamber 228 to the outlet passage 220. A fourth check valve 254 is located in another passage 256 and limits fluid flow in that passage only from the control chamber 228 to the inlet passage 218. Both of these check valve passages 252 and 256 have a have a flow restricting orifice 253 and 257 respectively.

When energized, the solenoid 236 pulls the pilot poppet 244 out of the aperture in the diaphragm 232, thereby opening the pilot passage in the diaphragm. The flow of hydraulic fluid through the pilot passage reduces the pressure in the control chamber 228 to that of the outlet passage 220. Thus the higher pressure in the inlet passage 218 forces main valve poppet 224 away from valve seat 222, thereby opening direct communication between the inlet passage 218 and the outlet passage 220. Movement of the main valve poppet 224 continues until contact occurs with the conical tip of the pilot poppet 244. Thus, the size of this main valve opening and the flow rate of hydraulic fluid through the control valve 200 are determined by the position of the pilot poppet 244 which is controlled by the magnitude of current flowing through the solenoid 236.

The second type of proportional control valve 200 can open only in response to activation of the solenoid 236 and not in response to high pressure in the outlet passage 220, unlike the valve in FIG. 1. When pressure in the outlet passage 220 exceeds the pressure in the control chamber 228, the first check valve 250 opens communicating that higher pressure to the control chamber equalizing the pressure on opposite sides of the main valve poppet 224. With those pressures being equal, the poppet surface area differential between the control chamber 228 and the outlet passage 220, as well as the spring force on the pilot poppet 244, keep the main valve poppet 224 closed.

The second check valve 254 performs a similar function to maintain the main poppet closed when the pressure in the inlet passage 218 rises.

Figure 4:
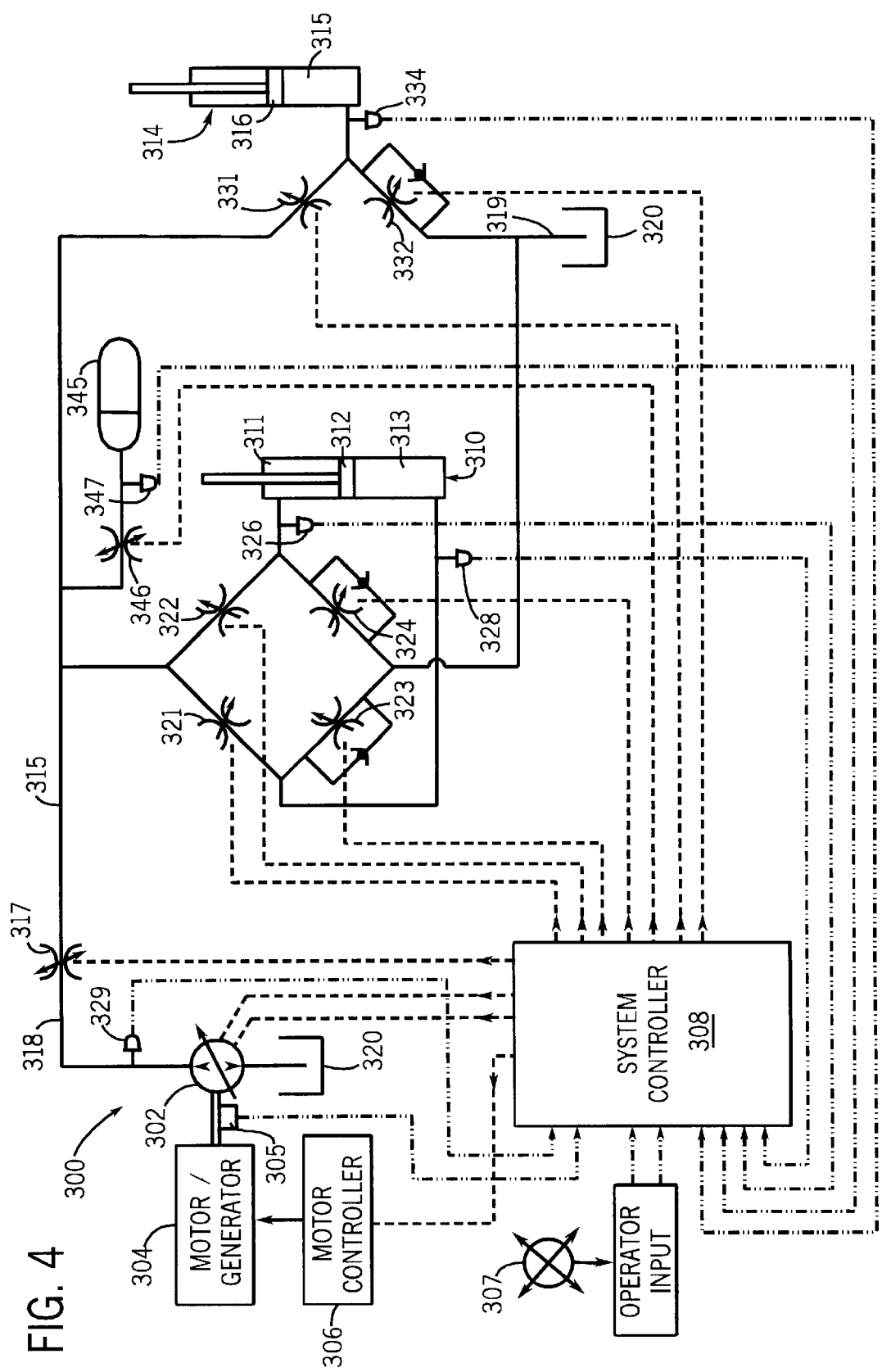
FIG. 4 is a schematic diagram of an alternative hydraulic system that employs the bidirectional valve of FIG. 3.

This type of valve 200 can be utilized to reduce the number of components required to implement cross functional regeneration and load to prime mover regeneration in a hydraulic system 300, shown in FIG. 4. As with the previously described system, an over-center pump 302 is driven by a motor/generator 304 to supply hydraulic fluid under pressure to a pump output line 318. A tachometer 305 or other speed sensing device provides a speed signal to a system controller 308. The motor/generator 304 is controlled by a motor controller 306 that receives commands from the system controller 308. The system controller 308 receives inputs from operator input devices such as a conventional joystick 307.

The pump 302 receives a signal from the system controller 308 which determines the position of the swash plate within the pump 302. The swash plate position not only controls the variable displacement output of the pump, but also can place the pump in a motor mode in which the hydraulic fluid being fed back to the pump from the hydraulic system can drive the pump and the hence drive the motor generator 304 to generate electricity, as will be described. Another signal from the system controller 308 also determines the stroke of the pump 302.

The pump output line 318 is connected to a supply line 315 by a isolation valve 317. The isolation valve 317 is a bidirectional, proportional valve of the type shown in FIG. 3 that is operated electrically by the system controller 308.

This type of valve 200 can be utilized to reduce the number of components required to implement cross functional regeneration and load to prime mover regeneration in a hydraulic system 300, shown in FIG. 4. As with the previously This hydraulic system 300 is incorporated in machinery that has mechanical elements operated by hydraulically driven actuators, such as cylinders 310 and 314 with pistons 332 and 316. The first cylinder 310 is a double acting type in that pressurized fluid can be applied to either side of its piston 332. A set of four proportional control valves 321, 322, 323, and 324 control the flow of hydraulic fluid into and out of the chambers 311 and 313 within cylinder 310. The inlet control valves 321 and 331 are bidirectional, proportional valves of the type shown in FIG. 3 and connect the supply line 321 to the first cylinder 310. The outlet control valves 323 and 324 are unidirectional, proportional valves of the type shown in FIG. 1 and directly connect the first cylinder 310 to the system tank 320. Note that the check valves and regeneration regulation valves are eliminated by the use of bidirectional, proportional control valves.

The system controller 308 receives signals from pressure sensors 326 and 328 which respectively sense the pressure within the upper and lower chambers 311 and 313 of cylinder 310. Another pressure sensor 329 is placed in the pump outlet line 318 to provide a pressure measurement signal to the system controller 308.

Fifth and sixth proportional solenoid control valves 331 and 332 govern the flow of hydraulic fluid to and from the second cylinder 314. The second cylinder 314 is a single acting device in that hydraulic fluid is only applied to its lower chamber 315. Specifically, the fifth control valve 331 governs flow of fluid from the pump output line 318 to the second cylinder 314 and is a bidirectional, proportional valve of the type shown in FIG. 3. The sixth control valve 332 regulates the flow of fluid from that cylinder to the tank 320 and is a unidirectional, proportional valve of the type shown in FIG. 1. Another pressure sensor 334 detects the pressure within the lower chamber 315 of the second cylinder 314. The signal from that sensor 334 is applied as an input to the system controller 308, which also provides operating signals to the fifth and sixth control valves 331 and 332.

Note that the check valves and regeneration regulation valves provided in the hydraulic system 100 in FIG. 2 are eliminated in the second system 300 by the use of the bidirectional, proportional control valves. The need for separate isolation valves at the cylinder control valves also is eliminated.

An accumulator 345 is connected to the transfer conduit 335 by a bidirectional accumulator isolation valve 346, which controls the flow of fluid into and out of the accumulator. A pressure sensor 347 measures the pressure in the accumulator 345.

In order to facilitate the description of the operation of the hydraulic system in FIG. 4, consider the example in which the load on the second cylinder 314 is being lowered while hydraulic fluid is being sent to the lower chamber 313 of the first cylinder 310. The piston 316 of the second cylinder normally is lowered by opening the sixth control valve 332. Cross regeneration may occur when the same criteria as stated for the system in FIG. 2 are satisfied. Specifically, the over-running load pressure (from the second cylinder 314) must be greater than the concurrent pressure demand (for powering first cylinder 310) by a first margin, and the flow rate command of the over-running load must exceed the concurrent function flow demand, preferably by a second margin. In this case, the fifth control valve 331 is opened to send at least a portion of the fluid exhausted from the second cylinder 314 into the supply line 315. This fluid flows through the first control valve 321 and into the lower chamber 313 of the first cylinder 310. Because the flow from the pump is not required to power either cylinder 310 or 314, the isolation valve 317 can be closed by the system controller 308.

If the first cylinder 310 is not being powered, the exhaust fluid from the second cylinder 314 can be routed to drive the pump 302 as a motor and in turn drive the motor/generator 304 to produce electricity. Now the first and second control valves 321 and 322 for the first cylinder will be closed. The isolation valve 317 is opened to send the exhaust fluid to the outlet of the pump 302. The system controller 108 commands the swash plate of the hydraulic pump 102 into a position where the pump acts as a motor. The system controller also sets the stroke of the pump. This sets up the pump 102 so that the reverse fluid flow from an actuator goes from the PUMP outlet to its inlet thereby driving the pump and the motor/generator 304.

At other times the exhaust fluid from the second cylinder can be stored in the accumulator 345. To accomplish this the accumulator isolation valve 346 is opened while isolation valve 317 is closed. Subsequently the fluid stored in the accumulator can be used to power a system function when the pressure and flow criteria for cross regeneration are satisfied.

In a double acting cylinder, such as the first cylinder 310, fluid draining from one chamber can be routed to the other chamber by selective activation of the control valves. For example, to lower the machine member connected a cylinder of a conventional hydraulic system, fluid normally is drained from the lower chamber 313 to tank, while fluid from the supply line is sent into the upper chamber 311. With the present regeneration system 300 the inlet control valves 321 and 322 are opened simultaneously to allow the hydraulic fluid to flow from the lower chamber 313 into the upper chamber 311. The force exerted on the piston by the load prevents fluid from the supply line from entering the lower chamber 313. If necessary, the isolation valve 317 can be temporarily closed also to prevent fluid from the pump from entering the first cylinder 310. Because the lower chamber 313 has a greater volume that the upper chamber 311, due to the volume of the piston rod, the fourth control valve 324 has to be opened slightly to release the excess fluid to the tank 320.

When the cylinder piston moves in the opposite direction, the regeneration system 300 can be enabled to permit hydraulic fluid to flow from the upper chamber 311 into lower chamber 313. In this case, the inlet control valves 321 and 322 again are opened simultaneously. However, because of the volume difference between the cylinder chambers, more fluid is required to fill the lower chamber 313 that will be drained from the upper chamber 311. Thus the outlet valve 323 remains closed and the additional fluid is received from the supply line 315.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A regeneration method for a hydraulic system having a first actuator and a hydraulic power converting device, said regeneration method comprising the steps of:

draining hydraulic fluid under pressure from the actuator;

sensing pressure of the hydraulic fluid drained from the actuator to produce an indication of a first pressure;

sensing pressure of hydraulic fluid at an inlet of the hydraulic power converting device to produce an indication of a second pressure;

determining when the fist pressure is greater than the second pressure; and in response to making the determination and when a flow rate of fluid from the actuator is a predefined amount greater than a flow rate desired for fluid supplied to the hydraulic power converting device, selectively routing the hydraulic fluid drained from the actuator to the inlet of the hydraulic power converting device thereby driving the hydraulic power converting device.

2. The regeneration method as recited in claim 1 wherein the hydraulic power converting device is a hydraulic cylinder and piston combination.

3. The regeneration method as recited in claim 1 wherein the hydraulic power converting device is a pump connected to a prime mover.

4. The regeneration method as recited in claim 1 further comprising when the hydraulic fluid drained from the actuator is not being routed to the hydraulic power converting device, storing at least a portion of the hydraulic fluid drained from the actuator in an accumulator of the hydraulic system; and thereafter routing hydraulic fluid from the accumulator to one of the actuator and the hydraulic power converting device.

5. The regeneration method as recited in claim 1 wherein routing the hydraulic fluid is performed in response to the first pressure being greater than the second pressure by a predefined amount.

6. In a hydraulic system having a pump connected to a prime mover, a tank, first actuator, a first control valve assembly which controls flow of fluid from the pump to the first actuator and from the first actuator to the tank, a second actuator; and a second control valve assembly which controls flow of fluid from the pump to the second actuator and from the second actuator to the tank; a regeneration system comprising:

a proportional regeneration regulation valve coupling a tank outlet of the first control valve assembly to the tank;

a first isolation valve coupling the tank outlet of the first control valve assembly to a pump inlet of the second control valve assembly;

a first pressure sensor connected to the first actuator and providing an indication of a first pressure;

a second pressure sensor connected to the second actuator and providing an indication of a second pressure; and a system controller having inputs connected to the first pressure sensor and the second pressure sensor, and having outputs connected to the regeneration regulation valve and the isolation valve, wherein when fluid is being drained under pressure from the first actuator the system controller at least partially closes the regeneration regulation valve and opens the isolation valve in response to the first pressure being greater than the second pressure, thereby driving the second actuator with the fluid being drained from the first actuator.

7. The regeneration system as recited in claim 6 further comprising a second isolation valve coupling the tank outlet of the first control valve assembly to an outlet of the pump and being operated by a signal from the system controller.

8. A regeneration method for a hydraulic system having a prime mover connected to a pump to supply hydraulic fluid under pressure, a first actuator and a second actuator, said regeneration method comprising the steps of:

draining hydraulic fluid under pressure from the first actuator;

sensing pressure of the hydraulic fluid drained from the first actuator to produce an indication of a first pressure;

selecting among a first mode of operation, a second mode of operation, and a third mode of operation:

in the first mode of operation:
(a) sensing pressure of the hydraulic fluid at an inlet of the second actuator to produce an indication of a second pressure, and
(b) in response to the first pressure being greater than the second pressure, routing hydraulic fluid drained from the first actuator to the inlet of the second actuator to drive the second actuator;

in the second mode of operation:
(c) when the pump is not supplying pressurized fluid to an actuator of the hydraulic system, routing hydraulic fluid drained from the first actuator to an outlet of the pump thereby causing the pump to drive the prime mover; and in the third mode of operation:
(d) sensing pressure of the hydraulic fluid in an accumulator to produce an indication of a third pressure, and
(e) in response to the first pressure being greater than the third pressure, storing the hydraulic fluid drained from the first actuator in the accumulator.

9. The regeneration method as recited in claim 8 further comprising when the first actuator is required to be powered, routing the hydraulic fluid from the accumulator to the first actuator.

10. In a hydraulic system having a pump connected to a prime mover, a tank, first actuator, and a second actuator; a regeneration system comprising:

supply line coupled to the pump;

a first control valve which connects the supply line to the first actuator and controls flow of fluid in either direction there between;

a second control valve which is unidirectional and controls flow of fluid from the first actuator to the tank, a third control valve which is unidirectional and connects the supply line to the second actuator;

a fourth control valve which is unidirectional and controls flow of fluid from the second actuator to the tank, a first pressure sensor connected to the first actuator and providing an indication of a first pressure;

a second pressure sensor connected to the second actuator and providing an indication of a second pressure; and a system controller having inputs connected to the first pressure sensor and the second pressure sensor, and having outputs connected to the first control valve, the second control valve, the third control valve, and the fourth control valve, wherein when fluid is being drained under pressure from the first actuator the system controller opens the third control valve and at least partially opens the first control valve in response to the first pressure being greater than the second pressure thereby driving the second actuator with the fluid being drained from the first actuator.

11. The regeneration system as recited in claim 10 further comprising an accumulator; and a second isolation valve coupling the supply line to the accumulator and being operated by a signal from the system controller.

12. The regeneration system as recited in claim 11 further comprising third pressure sensor connected to the accumulator and providing a signal to the control system.

13. The regeneration system as recited in claim 10 further comprising a first isolation valve coupling the supply line to an outlet of the pump and being operated by a signal from the system controller.

14. The regeneration system as recited in claim 10 wherein the first control valve is a bidirectional pilot operated poppet valve.

15. The regeneration system as recited in claim 10 wherein the third valve is a bidirectional pilot operated poppet valve.

16. In a hydraulic system having a pump connected to a prime mover, a tank, an actuator, and a double acting cylinder having a first chamber and a second chamber; a regeneration system comprising:

supply line coupled to the pump;

a first control valve which connects the supply line to the first chamber of the double acting cylinder;

a second control valve which controls flow of fluid from the first chamber of the double acting cylinder to the tank;

a first bidirectional pilot operated control valve which connects the supply line to the second chamber of the double acting cylinder;

a third control valve which controls flow of fluid from the second chamber of the double acting cylinder to the tank;

a second bidirectional-pilot operated control valve which connects the supply line to the actuator;

a fourth control valve which controls flow of fluid from the actuator to the tank;

a first pressure sensor connected to the first chamber of the double acting cylinder and providing an indication of a first pressure;

a second pressure sensor connected to the second chamber of the double acting cylinder and providing an indication of a second pressure;

a third pressure sensor connected to the actuator and providing an indication of a third pressure; and a system controller having inputs connected to the first pressure sensor and the second pressure sensor, and having outputs connected to the first bidirectional control valve, the second bidirectional control valve, the first control valve, the second control valve, the third control valve, and the fourth control valve;

wherein when fluid is being drained under pressure from the second chamber of the double acting cylinder, the system controller at least partially opens the first bidirectional control valve and the second bidirectional control valve in response to the first pressure being greater than the second pressure, thereby driving the actuator with the fluid being drained from the second chamber; and wherein when fluid is being drained under pressure from the actuator, the system controller at least partially opens the second bidirectional control valve and one of the first bidirectional control valve and the first control valve, thereby driving the double acting cylinder with the fluid being drained from the actuator.

17. The regeneration system as recited in claim 16 wherein the second control valve, the third control valve, and the fourth control valve are unidirectional.

18. The regeneration system as recited in claim 16 further comprising an isolation valve coupling the supply line to the pump and being operated by a signal from the system controller.

19. The regeneration system as recited in claim 16 further comprising an accumulator; and an isolation valve coupling the supply line to the accumulator and being operated by a signal from the system controller.

20. The regeneration system as recited in claim 19 further comprising fourth pressure sensor connected to the accumulator and providing a signal to the control system.

21. In a hydraulic system having a pump connected to a prime mover, a tank, a double acting cylinder having a first chamber and a second chamber, and an actuator, a regeneration system comprising:

a first control valve which connects the pump to the first chamber of the double acting cylinder;

a second control valve which controls flow of fluid from the first chamber of the double acting cylinder to the tank;

a bidirectional control valve which connects the pump to the second chamber of the double acting cylinder;

a third control valve which controls flow of fluid from the second chamber of the double acting cylinder to the tank;

a fourth control valve which connects the pump to the actuator;

a fifth control valve which controls flow of fluid from the actuator to the tank; and a system controller having outputs connected to the bidirectional control valve, the first control valve, the second control valve, and the third control valve;

wherein when fluid is being drained under pressure from the second chamber of the double acting cylinder, the system controller enters one of a first mode and a second mode, in the first mode the first control valve and the bidirectional control valve are opened thereby supplying the first chamber with fluid from the second chamber, and in the second mode the first bidirectional control valve and the fourth control valve are opened, thereby driving the actuator with the fluid being drained from the second chamber.

22. The regeneration system as recited in claim 21 wherein the second control valve, and the third control valve are unidirectional.

23. The regeneration system as recited in claim 21 wherein the system controller at least partially opens the third control valve when fluid is being drained under pressure from the second chamber of the double acting cylinder.

24. The regeneration system as recited in claim 21 wherein the fourth control valve is a bidirectional valve, and when fluid is being drained under pressure from the actuator, the system controller opens the fourth control valve and one of the first bidirectional control valve and the first control valve, thereby driving the double acting cylinder with the fluid being drained from the actuator.

25. The regeneration system as recited in claim 21 further comprising:

a first pressure sensor connected to the first chamber of the double acting cylinder and providing an indication of a first pressure that is applied to the system controller;

a second pressure sensor connected to the second chamber of the double acting cylinder and providing an indication of a second pressure that is applied to the system controller; and a third pressure sensor connected to the actuator and providing an indication of a third pressure that is applied to the system controller.

26. The regeneration system as recited in claim 21 wherein the first control valve, the second control valve, the third control valve, the fourth control valve, and the fifth control valve are unidirectional.

* * * * *